United States Patent [19]

Livesay

[11] 4,274,682
[45] Jun. 23, 1981

[54] SELF-LAPPING SEAL FOR TRACK CHAIN
[75] Inventor: Richard E. Livesay, Peoria, Ill.
[73] Assignee: Caterpillar Tractor Co., Peoria, Ill.
[21] Appl. No.: 48,899
[22] Filed: Jun. 15, 1979

Related U.S. Application Data

[63] Continuation of Ser. No. 938,551, Aug. 31, 1978.
[51] Int. Cl.³ .............................................. B62D 55/20
[52] U.S. Cl. ..................................... 305/11; 277/96.2
[58] Field of Search ................... 277/1, 84, 92, 95, 96, 277/96.2, 206; 305/11, 14, 58 R, 59

[56] References Cited
U.S. PATENT DOCUMENTS

| | | | |
|---|---|---|---|
| 3,601,413 | 8/1971 | Darnell | 277/96.2 |
| 3,841,718 | 10/1974 | Reinsma | 277/206 |
| 3,918,925 | 11/1975 | McComas | 277/96.2 X |
| 4,089,531 | 5/1978 | Roley et al. | 277/206 R |

Primary Examiner—David A. Scherbel
Attorney, Agent, or Firm—Wegner, Stellman, McCord, Wiles & Wood

[57] ABSTRACT

A track structure (10) having an annular seal (24) defined by a C-shaped cross section for movably sealing the end (18) of the track pin (17) to an outer bushing surface (20). A shallow portion (32) of the seal is impregnated with lapping compound to lap the confronting sealing surface (20) of the bushing so as to provide a positive seal therebetween. The improved seal eliminates the need for lapping the sealing surfaces of the track structure prior to assembly. The portion (32) of the sealing surface of the seal impregnated with lapping compound provides the desired lapping of the confronting track structure surface as the result of relative movement between the seal and that surface which may be effected during a break-in period as desired.

35 Claims, 3 Drawing Figures

SELF-LAPPING SEAL FOR TRACK CHAIN

This is a continuation of application Ser. No. 938,551 filed Aug. 31, 1978.

TECHNICAL FIELD

This invention relates to track structures and in particular to means for sealing the sealed and lubricated track joint oil reservoir of such track structures.

BACKGROUND ART

In one form of conventional track structure, the track pin extending between the spaced parallel track links is received in a bushing having its opposite ends terminating in an aperture in an inner pair of track link portions. The ends of the pin extend outwardly from the bushing and are received in aligned apertures of an outer pair of track link portions. A number of seals have been developed for sealing the oil reservoir within the bushing. One improved form of such a seal comprises a C-shaped, or crescent seal, having one leg sealingly engaging the end of the bushing and the opposite leg sealingly engaging the outer track portion. A load ring is disposed between the legs so as to provide the desired sealing force of the legs against the sealing surfaces of the confronting track elements.

A problem has arisen in the manufacture of such seals in that it is necessary to provide a smooth sealing surface against which the seal leg is urged to assure the proper seal of the oil reservoir. It has been conventional to lap finish the metal surface so as to provide a surface roughness of approximately 4 to 6 microinches. The machine surfaces normally have a surface roughness of approximately 16 to 20 microinches and, thus, a substantial lapping operation is required.

DISCLOSURE OF THE INVENTION

The present invention is directed to overcoming the problem set forth above.

The present invention comprehends an improved track structure having a novel means for movably sealing the track joint oil reservoir which is extremely simple and economical of construction while yet providing a positive long-life seal thereof.

More specifically, the invention comprehends providing lapping means on a sealing leg of the annular C-shaped seal for lapping the confronting track sealing surface as a result of relative movement between the seal and the sealing surface as in normal use of the track structure.

In the illustrated embodiment, the lapping means comprises a surface layer of the seal impregnated with lapping compound to a shallow depth permitting ablation thereof in the lapping of the sealing surface thereby, thereby preventing excessive lapping of the sealing surface. Upon undergoing such ablation, the remaining portion of the seal surface portion is urged into accurate sealing engagement with the thusly lapped sealing surface to provide an improved positive and effective oil seal.

As the joint wears in use, the load ring of the seal tends to urge the C-shaped seal leg progressively against the sealing surface to maintain the desired lapped sealing surface engagement with the progressively ablated sealing surface portion of the annular seal.

Thus, not only does the seal of the present invention effect a self-lapping operation eliminating the highly costly and time-consuming lapping operations heretofore required in such track structure formation, but also provides a progressive lapping operation occurring as an incident of wear of the joint so as to provide freshly lapped sealing means between the seal and joint structure sealing surface at all times during the useful life of the seal.

The seal of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
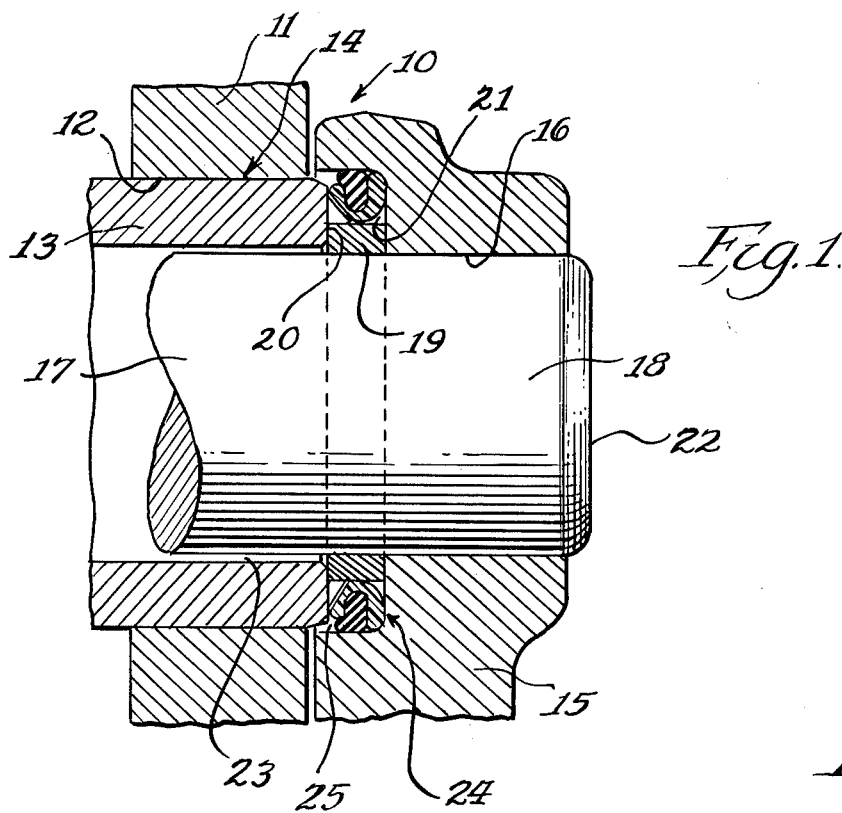
FIG. 1 is a diametric section of a track structure having improved sealing means embodying the invention.

In the exemplary embodiment of the invention as disclosed in the drawing, a track structure generally designated 10 is shown to comprise a first, or inner, track link portion 11 defining an opening 12 in which is received the end 13 of a track pin bushing 14.

A second track link defines an outer track link portion 15 overlapping the inner portion 11 and defining an opening 16 aligned coaxially with the opening 12 and the tubular bushing 13.

A track pin generally designated 17 defines an end portion 18 extending outwardly from the bushing 14 and terminating substantially in opening 16 of the outer track portion 15.

A thrust ring 19 may be provided between the outer end surface 20 of bushing 14 and an inner sealing surface 21 of the outer track link portion 15. Thus, as seen in FIG. 2, the thrust ring maintains the track link portions 11 and 15 in preselected spaced relationship with the outer end 22 of the track pin portion 18 terminating substantially flush with the outer surface of the outer link portion 15.

INDUSTRIAL APPLICABILITY

The present invention is concerned with the sealing of the oil reservoir defined by the annular space 23 between the pin 17 and the bushing 13 in which it is coaxially received. For this purpose, a seal means generally designated 33 is provided including an annular seal ring generally designated 24 provided in a seal space 25 cooperatively defined by the bushing outer end surface 20, the thrust ring 19, the outer track portion sealing surface 21 and a radially outer annular shoulder 26 of the outer track portion 15.

Figures 2, 3:
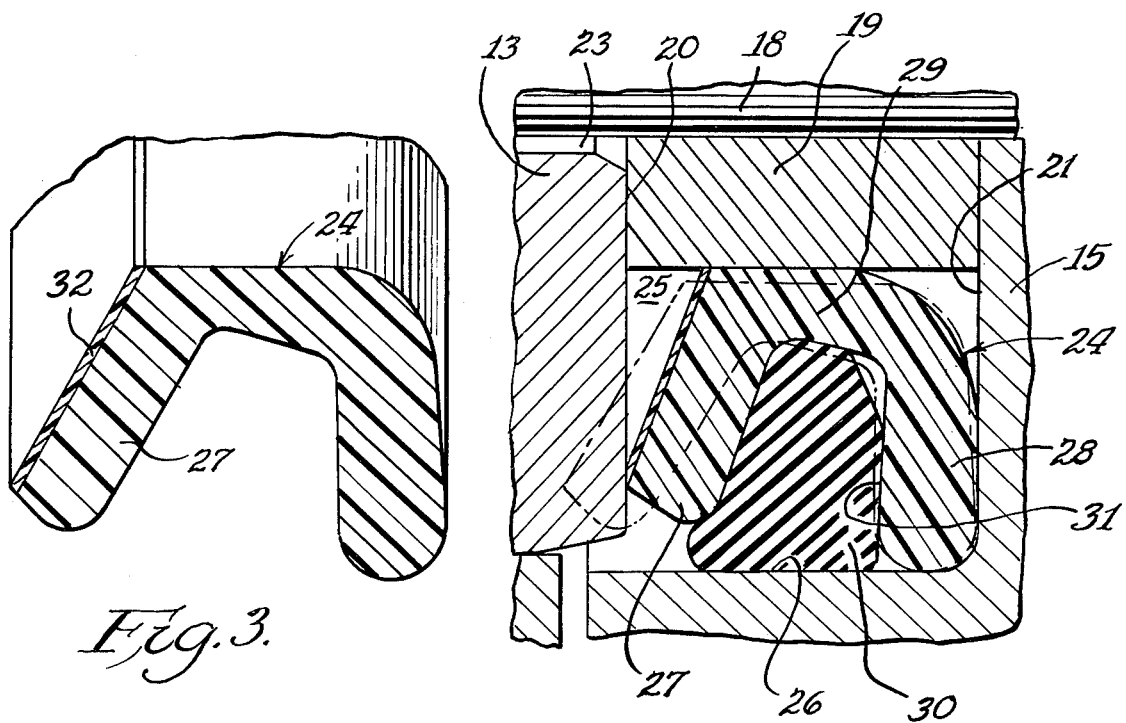
FIG. 2 is a fragmentary enlarged view thereof illustrating in greater detail the improved sealing means.
FIG. 3 is a fragmentary cross section of the seal ring in free form.

As best seen in FIG. 2, the seal ring 24 is C-shaped, or crescent-shaped, having an inner leg 27, an outer leg 28, and a bight portion 29. A load ring 30 is disposed within the radially outwardly opening annular recess 31 defined by the legs 27 and 28 and bight 29, and provides a resilient urging of the legs axially apart so as to urge leg 27 toward bushing end surface 20 and leg 28 toward outer link portion sealing surface 21.

As seen in FIG. 3, the axially inner surface portion 32 of leg 27 defines a lapping portion. More specifically, the invention comprehends impregnating the surface portion 32 of the leg with lapping compound to a shallow depth. Illustratively, the surface portion 32 may be impregnated to a depth of approximately 0.001" to 0.002". The depth of the lapping portion 32 is preferably small so as to permit the surface to be effective in lapping the confronting surface 20 of the bushing end while avoiding cutting the surface 20 too deeply so as to destroy the seal's effectiveness. Thus, the lapping surface portion 32 is ablative so that upon the wearing away thereof in effecting the lapping operation, the underlying portion of the leg 27 is urged into effective sealing engagement with the thusly lapped area of the surface 20 by the load ring 30 to provide a highly effective, positive seal of the oil reservoir 23. The self-lapping operation of the track structure permits a substantial economy in the manufacture thereof by permitting the end surface 20 to be as machined so as to have a normal machining surface roughness of approximately 16 to 20 microinches. As a result of the self-lapping action, the area of the bushing end surface 20 engaged by the leg 27 in effecting the desired seal has a smooth surface with a surface roughness of approximately 4 to 6 microinches.

As the seal wears, the sealing portion of the leg 27 tends to move radially inwardly toward the axis of the joint. As this occurs, fresh portions of the lapping surface portion 32 act against the sealing surface 20 to assure that the seal between leg 27 and surface portion 20 is with a lapped area of the surface 20 at all times.

The effective sealing of leg 27 to surface 20 may be effected by a preliminary run-in which may be quickly effected by simple oscillation of the track structure elements, as desired.

As will be obvious to those skilled in the art, the self-lapping operation may be effected not only between leg 27 and bushing surface 20, but may be similarly effected between leg 28 and link surface 21 by suitable provision of The impregnated surface portion of the lapping means on the axially outer portion of leg 28.

Thus, in broadest aspect, the invention comprehends providing the self-lapping means on at least one of the legs of the seal for lapping the confronting sealing surface or surfaces of the track structure as a result of relative movement between the seal and the surface or surfaces. In the illustrated embodiment, the seal may be formed of a synthetic resin permitting facilitated impregnation of the surface thereof with the lapping compound. As discussed above, the impregnation is preferably limited in depth so as to provide the desired lapping of the rough machined confronting surface and the automatic subsequent use of the subjacent portion of the seal as the sealing surface means thereof upon application of the impregnated surface lapping portion.

The foregoing disclosure of specific embodiments is illustrative of the broad inventive concepts comprehended by the invention.

What is claimed is:

1. In a track structure (10) having a bushing (14) coaxially carrying a track pin (17) and having an annular end (13) terminating in an aperture (12) of a first track link (11), said pin having an end (18) extending outwardly through said bushing end and being received in an aligned aperture (16) of a second track link (15) overlapping said first track link, seal means (33) for movably sealing the bushing end to the overlapping track link comprising:

an annular seal (24) having a C-shaped cross section defining a radially inner bight portion (29), a first leg (27) engaging said bushing end, and a second leg (28) engaging said overlapping track link;

resilient loading means (30) for urging said legs apart to cause said first leg to be movably sealed to said bushing end and said second leg to be movably sealed to said overlapping track link; and lapping means (32) on said first leg for lapping said bushing end as a result of relative movement between said seal first leg and said bushing end to provide a smooth sealing surface on said bushing end.

2. The track structure of claim 1 wherein said lapping means (32) comprises lapping compound impregnated in the surface of said first leg (27) engaging the bushing end (13).

3. The track structure of claim 1 wherein said lapping means (32) comprises lapping compound impregnated in the surface of said first leg (27) engaging the bushing end (13), said lapping compound defining a layer having a depth of approximately 0.001" to 0.002".

4. The track structure of claim 1 wherein said bushing end (13) defines a surface (20) having an approximately 16 to 20 microinches unlapped surface roughness.

5. The track structure of claim 1 wherein said bushing end (13) defines an induction hardened surface (20) having an approximately 16 to 20 microinches unlapped surface roughness.

6. The track structure of claim 1 wherein the surface portion of said first leg (27) engaging the bushing end (13) is frustoconical in free form and said lapping means (32) comprises lapping compound impregnated in said surface portion.

7. The track structure of claim 1 wherein said one sealing surface (20) comprises a standard machined and hardened metal surface.

8. The track structure of claim 1 wherein said annular seal (24) is formed of a synthetic resin and said lapping means (32) comprises lapping compound on said first leg (27).

9. In a track structure (10) having a bushing (14) coaxially carrying a track pin (17) and having an annular end (13) defining a sealing surface (20) at an aperture (12) of a first track link (11), said pin having an end (18) extending outwardly through said bushing end and being received in an aligned aperture (16) of a second track link (15) overlapping said first track link, seal means (33) for movably sealing the bushing end sealing surface to the inner sealing surface of said overlapping track link comprising:

an annular seal (24) having a C-shaped cross section defining a radially inner bight portion (29), a first leg (27) engaging said bushing end, and a second leg (28) sealingly engaging said overlapping track link;

means (30) for urging said first leg movably against said bushing end; and lapping means (32) on said first leg for lapping said bushing end sealing surface as a result of relative movement between said seal means (33) and said sealing surface (20) to provide an improved seal therebetween.

10. The track structure of claim 9 wherein said lapping means (32) comprises lapping compound on said first leg (27).

11. In a track structure (10) having a bushing (14) coaxially carrying a track pin (17) and having an annular end (13) terminating in an aperture (12) of a first track link (11), said pin having an end (18) extending outwardly through said bushing end and being received in an aligned aperture (16) of a second track link (15) overlapping said first track link, seal means (33) for movably sealing the bushing end to the overlapping track link comprising:

an annular seal (24) having at least one sealing surface (34) adapted to sealingly engage said bushing end (13), said sealing surface (34) further including lapping means (32) for lapping said bushing end (13) as a result of relative movement between said sealing surface (34) and said bushing end (13) to provide a smooth sealing surface on said bushing end; and means (30) for urging said sealing surface into sealing engagement with said bushing end (13).

12. The track structure of claim 11 wherein said lapping means (32) comprises lapping compound impregnated in said sealing surface (34), said lapping compound defining a layer having a depth of approximately 0.001″ to 0.002″.

13. The track structure of claim 12 wherein said bushing end sealing surface (20) comprises a standard machined and hardened metal surface.

14. The track structure of claim 12 wherein said annular seal (24) is formed of a synthetic resin and said lapping means (32) comprises lapping compound on said sealing surface (34).

15. The track structure as defined in claim 12 wherein said lapping means (32) comprises a progressively ablative lapping compound disposed on said sealing surface (34) to prevent excessive lapping of said bushing end (13).

16. The track structure as defined in claim 12 wherein said lapping means (32) comprises a progressively ablative lapping compound disposed on said sealing surface (34) to prevent excessive lapping of said bushing end sealing surface (20).

17. The track structure of claim 11 wherein said bushing end (13) defines a surface (20) having an approximately 16 to 20 microinches unlapped surface roughness.

18. The track structure of claim 11 wherein said bushing end (13) defines an induction hardened surface (20) having an approximately 16 to 20 microinches unlapped surface roughness.

19. The track structure of claim 11 wherein said sealing surface (34) is frustoconical in free form and said lapping means comprises lapping compound impregnated in said sealing surface.

20. In a track structure (10) having a bushing (14) coaxially carrying a track pin (17) and having an annular end (13) defining a sealing surface (20) at an aperture (12) of a first track link (11), said pin having an end (18) extending outwardly through said bushing end and being received in an aligned aperture (16) of a second track link (15) overlapping said first track link, seal means (33) for movably sealing the bushing end sealing surface to the inner sealing surface of said overlapping track link comprising:

an annular seal (24) having at least one sealing surface (34) adapted to sealingly engage said bushing end sealing surface (20), said sealing surface (34) further including lapping means (32) for lapping said bushing end sealing surface (20) as a result of relative movement between said sealing surface (34) and said bushing end sealing surface (20) to provide an improved seal therebetween; and means (30) for urging said sealing surface (34) into sealing engagement with said bushing end sealing surface (20).

21. The track structure of claim 11 or 20 wherein said annular seal (24) is in the form of a C-shaped cross section defining a radially inner bight portion (29), a first leg (27) having said sealing surface (34) formed thereon for sealingly engaging said bushing end (13), and a second leg (28) for engaging said overlapping track link (15).

22. The track structure of claim 11 or 20 wherein said lapping means (32) comprises lapping compound impregnated in said sealing surface (34).

23. A seal assembly (33) for sealing two relatively movable members comprising:

seal means (24) having at least one sealing surface (34) adapted to sealingly engage said one of said movable members, said sealing surface (34) further including lapping means (32) for lapping said one of said movable members as a result of relative movement between said sealing surface (34) and said one of said movable members to provide an improved seal therebetween; and means (30) for urging said sealing surface (34) into sealing engagement with said one of said movable members.

24. The seal assembly of claim 23 wherein said seal means is in the form of an annular seal (24) having a C-shaped cross section defining a radially inner bight portion (29), a first leg (27) having said sealing surface (34) formed thereon for engaging said one of said movable members, and a second leg for engaging said other of said movable members.

25. The seal assembly of claim 24 wherein said annular seal (24) is formed of a synthetic resin and said lapping means (32) comprises progressively ablative lapping compound on said sealing surface (34).

26. The seal assembly of claim 23 wherein said lapping means (32) comprises lapping compound on said sealing surface (34).

27. The seal assembly of claim 26 wherein said lapping compound is progressively ablative to permit excessive lapping of said one of said movable members.

28. The seal assembly of claim 23 wherein said lapping means (32) comprises lapping compound on said sealing surface (34), said lapping compound defining a layer having a depth of approximately 0.001″ to 0.002″.

29. The seal assembly of claim 28 wherein said lapping compound is progressively ablative to prevent excessive lapping of said one of said movable members.

30. In a structure (10) having an annular seal space (25) defined by a first surface (20), and an opposite second surface (21), seal means (33) in said space for movably sealing the first surface to the second surface comprising:

an annular seal (24) having a C-shaped cross section defining a bight portion (29), a first leg (27) engaging said first surface (20), and a second leg (28) engaging said second surface (21);

resilient loading means (30) for urging said legs apart to cause said first leg to be movably sealed to said first surface and said second leg to be sealed to said second surface; and lapping means (32) on said first leg for lapping said first surface as a result of relative movement between said seal first leg and said first surface to provide a smooth sealing finish on said first surface.

31. The structure of claim 30 wherein said lapping means comprises lapping compound on the surface (34) of said first leg (27) engaging said first surface (20).

32. The structure of claim 30 wherein said lapping means (32) comprises lapping compound impregnated in the surface (34) of said first leg (27) engaging said first surface (20), said lapping compound defining a layer having a depth of approximately 0.001" to 0.002".

33. The structure of claim 30 wherein said surface (20) has an approximately 16 to 20 microinches unlapped surface roughness.

34. The structure of claim 30 wherein said first surface (20) comprises a standard machined and hardened metal surface.

35. The structure of claim 30 wherein said annular seal (24) is formed of a synthetic resin.

* * * * *